(12) United States Patent
Abe

(10) Patent No.: US 7,817,237 B2
(45) Date of Patent: Oct. 19, 2010

(54) LCD PANEL AND DEVICE HAVING A NON-OVERLAPPING AREA OF A FIRST SUBSTRATE WITH A PAIR OF PROTRUDING SEAL MEMBERS WITH WIRING LINES OVERLAPPING THE AREA BUT PATTERNED TO AVOID THE PROTRUDING MEMBERS

(75) Inventor: Hideaki Abe, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 240 days.

(21) Appl. No.: 12/131,187

(22) Filed: Jun. 2, 2008

(65) Prior Publication Data
US 2008/0304000 A1 Dec. 11, 2008

(30) Foreign Application Priority Data
Jun. 5, 2007 (JP) .............................. 2007-148707

(51) Int. Cl.
*G02F 1/1339* (2006.01)
(52) U.S. Cl. ....................... 349/153; 349/190
(58) Field of Classification Search ................. 349/153, 349/154, 190
See application file for complete search history.

(56) References Cited
U.S. PATENT DOCUMENTS
5,893,625 A * 4/1999 Tamatani et al. ............ 349/189
2002/0171798 A1* 11/2002 Tanaka et al. ............... 349/153

2005/0094084 A1* 5/2005 Hsu et al. ................... 349/153

FOREIGN PATENT DOCUMENTS
JP 11-109381 4/1999
JP 2001-183678 A 7/2001
KR 1994-15914 A 7/1994

* cited by examiner

*Primary Examiner*—John Heyman
(74) *Attorney, Agent, or Firm*—Antonelli, Terry, Stout & Kraus, LLP.

(57) ABSTRACT

According to the present invention, the cost reduction of the liquid crystal display device can be achieved. The present invention includes a liquid crystal display panel including a seal member for bonding a first substrate and a second substrate with each other, a liquid crystal inlet port provided to a part of the seal member, and a liquid crystal material input into and encapsulated in a space between the first substrate and the second substrate and surrounded by the seal member, wherein the first substrate has first and second sides located opposite to each other, the first substrate has a non-overlapping area not overlapping the second substrate on the side of the first side of the first substrate, the liquid crystal inlet port is disposed on the side of the second side of the first substrate, the seal member has a first part disposed like a frame on a periphery of an area between the first substrate and the second substrate, and a pair of second parts respectively extending from the first part on both sides of the liquid crystal inlet port towards the second side of the first substrate, and the non-overlapping area of the first substrate is provided with a pair of protruding members made of the same material as the seal member.

16 Claims, 9 Drawing Sheets

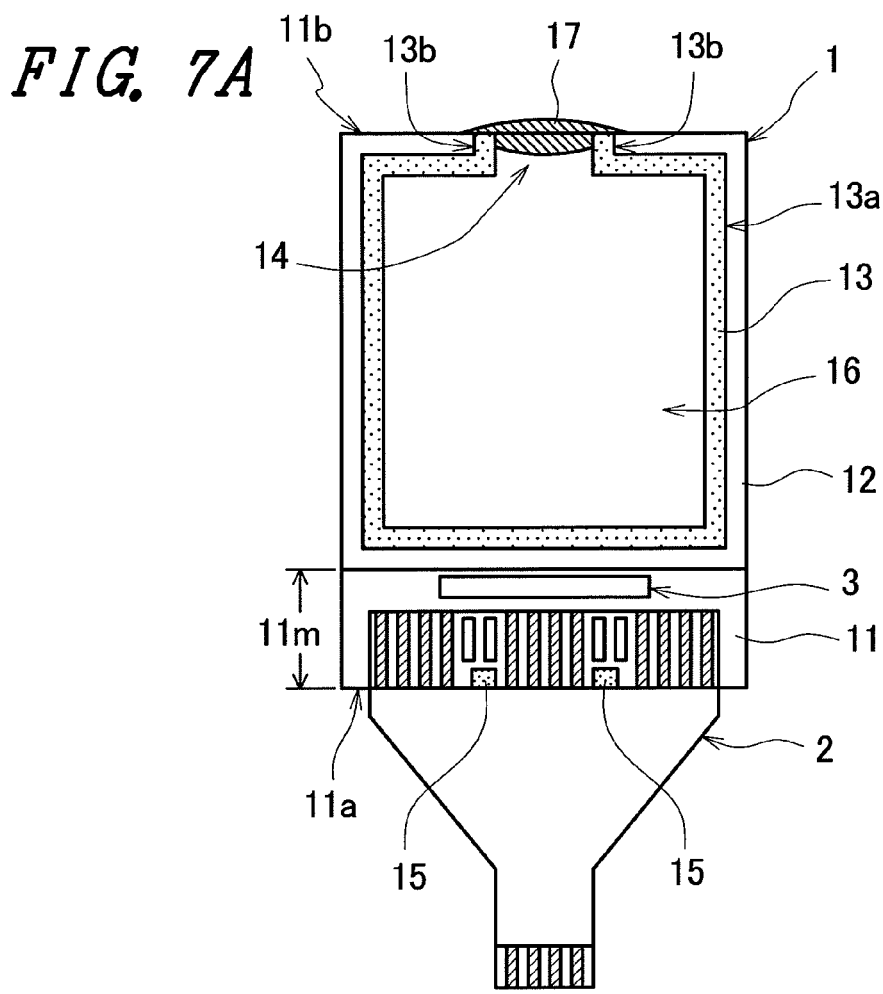
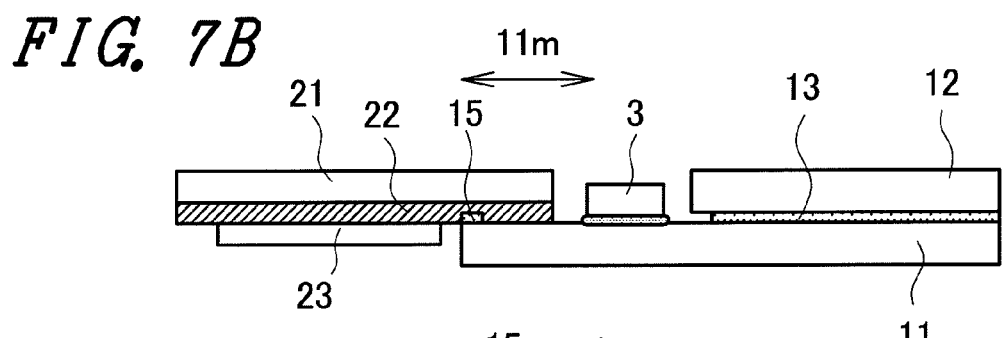
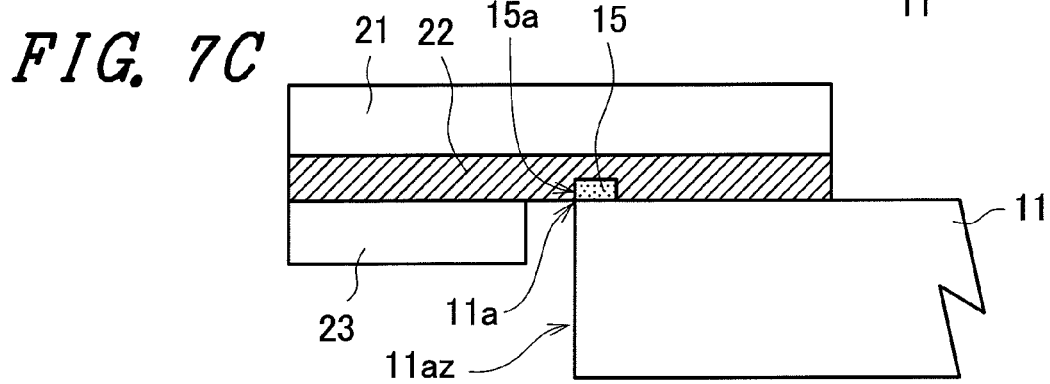
FIG. 7A
FIG. 7B
FIG. 7C

LCD PANEL AND DEVICE HAVING A NON-OVERLAPPING AREA OF A FIRST SUBSTRATE WITH A PAIR OF PROTRUDING SEAL MEMBERS WITH WIRING LINES OVERLAPPING THE AREA BUT PATTERNED TO AVOID THE PROTRUDING MEMBERS

CROSS-REFERENCE TO RELATED APPLICATIONS

The disclosure of Japanese Patent Application No. 2007-148707 filed on Jun. 5, 2007 including the specification, drawings and abstract is incorporated herein by reference in its entirety.

BACKGROUND

1. Field of the Invention

The present invention relates to a liquid crystal display device, and in particular to a technology effectively applied to the liquid crystal display device (a liquid crystal display module) provided with a flexible printed circuit board (FPC) connected to the terminal section of the liquid crystal display panel.

2. Description of the Related Art

Thin film transistor (TFT) liquid crystal display modules each having a small-sized liquid crystal display panel with the number of sub-pixels as small as 240×320×3 in color display are widely used as the display sections of portable equipment such as cellular phones.

The liquid crystal display module used as the display section of portable equipment such as a cellular phone is provided with a liquid crystal display panel and a flexible printed circuit board (FPC) connected to the liquid crystal display panel.

The liquid crystal display panel has a configuration including a first substrate (hereinafter referred to as a TFT substrate) provided with pixel electrodes, thin film transistors, and soon, a second substrate (hereinafter referred to as a CF substrate) provided with a color filter and so on, a seal member disposed between the TFT substrate and the CF substrate and for bonding the TFT substrate and the CF substrate with each other, a liquid crystal inlet port provided to a part of the seal member, and a liquid crystal material input into and encapsulated in the space between the TFT substrate and the CF substrate and surrounded by the seal member.

Each of the TFT substrate and the CF substrate has a rectangular planer shape, and is, for example, formed of an oblong having long sides and short sides. The TFT substrate is configured to have long sides longer than the long sides of the CF substrate to have an area (hereinafter referred to as a non-overlapping area) not overlapping the CF substrate on the side of one of the two short sides located opposite to each other. In the non-overlapping area on the TFT substrate, there is mounted a semiconductor chip including a circuit for performing drive control of the liquid crystal display panel, and further, a plurality of external connection terminals is disposed along the one short side (the short side on the side of the non-overlapping area) of the TFT substrate.

The liquid crystal inlet port is provided on the side of the other short side (the short side opposite to the non-overlapping area) of the TFT substrate. The seal member has both functions of bonding the TFT substrate and the CF substrate with each other and of inputting and encapsulating the liquid crystal material, and is configured to have a frame part (a first part) disposed between the TFT substrate and the CF substrate on the periphery thereof like a frame and a pair of inlet port parts (second parts) extending from the frame part at both sides of the liquid crystal inlet port towards the opposite short side of the TFT substrate.

The flexible printed circuit board is configured to have a plurality of wiring lines each extending to traverse a first side of the TFT substrate, and connected to the non-overlapping area of the TFT substrate at one end thereof. One ends of the plurality of wiring lines are arranged in parallel to each other corresponding respectively to a plurality of external connection terminals disposed in the non-overlapping area of the TFT substrate, and are electrically and mechanically connected respectively to the plurality of external connection terminals with, for example, anisotropic conductive films (ACF).

It should be noted that as a related art document related to the present invention, the following Patent Document 1 can be cited.

JP-A-11-109381 (Patent Document 1) discloses a technology of disposing an inlet port formed of the seal member on a second side opposite to a first side provided with a group of terminals, and disposing the group of terminals and the inlet port diametrically opposite to each other, thereby preventing the problems caused mainly by the seal member.

SUMMARY

Generally, in the manufacturing process of the TFT liquid crystal display module, in order for realizing improvement in throughput, there are used a multi-TFT substrate having a plurality of product forming regions each separated with scribe lines, and provided with pixel electrodes, thin film transistors, and soon, and a multi-CF substrate having a plurality of product forming regions each separated with scribe lines, and provided with a color filter, and soon, and after providing a seal member to each of the product forming regions of the multi-TFT substrate, the multi-TFT substrate and the multi-CF substrate are bonded with the seal members, and then the multi-TFT substrate and the multi-CF substrate are divided (segmented) along the respective scribe lines, thereby forming the liquid crystal display panels.

Incidentally, cost reduction is required also in the TFT liquid crystal module. In order for achieving the cost reduction, it is effective to provide the product forming regions to the multi-TFT substrate and the multi-CF substrate as many as possible, thereby increasing the product obtaining rate at which the product can be obtained from one multi-substrate.

However, since the outside dimensions of the multi-TFT substrate and the multi-CF substrate are standardized, it might become difficult to arrange the product forming regions for every column or line depending on the outside dimensions of the liquid crystal display panel. Such waste can be reduced by making the outside dimensions of the liquid crystal display panel as small as possible without reducing the display area.

Therefore, the inventors of the present invention have focused attention on the fact that the product forming region is separated by the scribe lines so that the whole of the pair of inlet port parts (the second parts) of the seal member is disposed in the product forming region, and made the present invention.

An object of the present invention is to provide a technology capable of achieving the cost reduction of the liquid crystal display device.

The object described above, other objects and novel features of the invention will be made apparent from the descriptions in the present specification and the accompanying drawings.

A summary of representative aspects of the invention disclosed in the present patent application will briefly be explained below.

The object described above can be achieved by arranging that the scribe lines for separating the product forming regions of the multi-TFT substrate are traversed by the pair of inlet port parts of the seal member (the second parts). The liquid crystal display device thus formed has the configurations described below.

(1) In the liquid crystal display device, there is provided a liquid crystal display panel including a first substrate, a second substrate, a seal member disposed between the first substrate and the second substrate, and for bonding the first substrate and the second substrate with each other, a liquid crystal inlet port provided to a part of the seal member, and a liquid crystal material disposed in a space between the first substrate and the second substrate and surrounded by the seal member, wherein the first substrate has first and second sides located opposite to each other, the first substrate has a non-overlapping area not overlapping the second substrate on the side of the first side of the first substrate, the liquid crystal inlet port is disposed on the side of the second side of the first substrate, the seal member has a first part disposed like a frame on a periphery of an area between the first substrate and the second substrate, and a pair of second parts respectively extending from the first part on both sides of the liquid crystal inlet port towards the second side of the first substrate, and the non-overlapping area of the first substrate is provided with a pair of protruding members made of the same material as the seal member.

(2) In the liquid crystal display device according to (1), at least apart of the pair of protruding members is located on extension lines of the pair of second parts of the seal member.

(3) In the liquid crystal display device according to (1) or (2), the pair of protruding members each have a surface in alignment with a side surface along the first side of the first substrate.

(4) In the liquid crystal display device according to (1) or (2), the pair of protruding members are cut at a position where the pair of protruding members are in alignment with a side surface along the first side of the first substrate.

(5) In the liquid crystal display device according to (3) or (4), the first side of the first substrate is unchamfered.

(6) In the liquid crystal display device according to any one of (1) through (5), a flexible printed circuit board having a plurality of wiring lines connected to the non-over lapping area of the first substrate is further provided, and the plurality of wiring lines are divided into three wiring line groups in a part overlapping the non-overlapping area of the first substrate in a plan view avoiding the pair of protruding members.

(7) In the liquid crystal display device according to (6), a middle one of the three wiring line groups has a smaller number of wiring lines than the other two wiring line groups.

(8) In the liquid crystal display device according to any one of (1) through (5), a flexible printed circuit board having a plurality of wiring lines connected to the non-over lapping area of the first substrate is further provided, and the plurality of wiring lines are patterned so as to avoid the pair of protruding members in a part overlapping the non-overlapping area of the first substrate in a plan view.

(9) In the liquid crystal display device according to (8), the plurality of wiring lines has narrower pitches in the part patterned to avoid the pair of protruding members than arrangement pitches of tip portions of the one ends of the plurality of wiring lines.

(10) In the liquid crystal display device according to any one of (6) through (9), the first substrate has a plurality of terminals disposed in the non-overlapping area of the first substrate, the pair of protruding members are disposed between the plurality of terminals and the first side of the first substrate, and one ends of the plurality of wiring lines are connected respectively to the plurality of terminals.

According to another embodiment of the present invention, a liquid crystal display panel includes a first substrate with a rectangular shape, a second substrate with a rectangular shape smaller in size than the first substrate, and a seal member disposed so as to surround a liquid crystal material disposed in an area where the first substrate and the second substrate overlap each other, the first substrate has first and second sides located opposite to each other, and has a non-overlapping area not overlapping the second substrate on the side of the first side, the seal member is provided with a liquid crystal inlet port on the side of the second side of the first substrate, and the liquid crystal inlet port is provided with a sealing member, and a protruding member made of the same material as the seal member is disposed on an end of the first side of the first substrate in accordance with a position corresponding to an end of an opening of the liquid crystal inlet port disposed on the side of the second side.

An advantage obtained by the representative embodiments of the invention disclosed in the present patent application will be briefly explained below.

According to the present invention, the cost reduction of the liquid crystal display device can be achieved.

BRIEF DESCRIPTION OF THE DRAWINGS

FIGS. 1A, 1B, and 1C are diagrams showing a schematic configuration of a liquid crystal display module as a first embodiment of the present invention, wherein FIG. 1A is a plan view, FIG. 1B is a side view, and FIG. 1C is an enlarged view of a part of FIG. 1B.

FIGS. 6A and 6B are diagrams showing the liquid crystal display panel formed by dividing (segmenting) the multi-TFT substrate and the multi-CF substrate thus bonded with each other along the scribe lines in the manufacturing process of the liquid crystal display module as the first embodiment of the present invention, wherein FIG. 6A is a plan view, and FIG. 6B is a side view.

FIGS. 7A, 7B, and 7C are diagrams showing a schematic configuration of a liquid crystal display module as a second embodiment of the present invention, wherein FIG. 7A is a plan view, FIG. 7B is a side view, and FIG. 7C is an enlarged view of a part of FIG. 7B.

DETAILED DESCRIPTION OF THE INVENTION

Figure 1A:
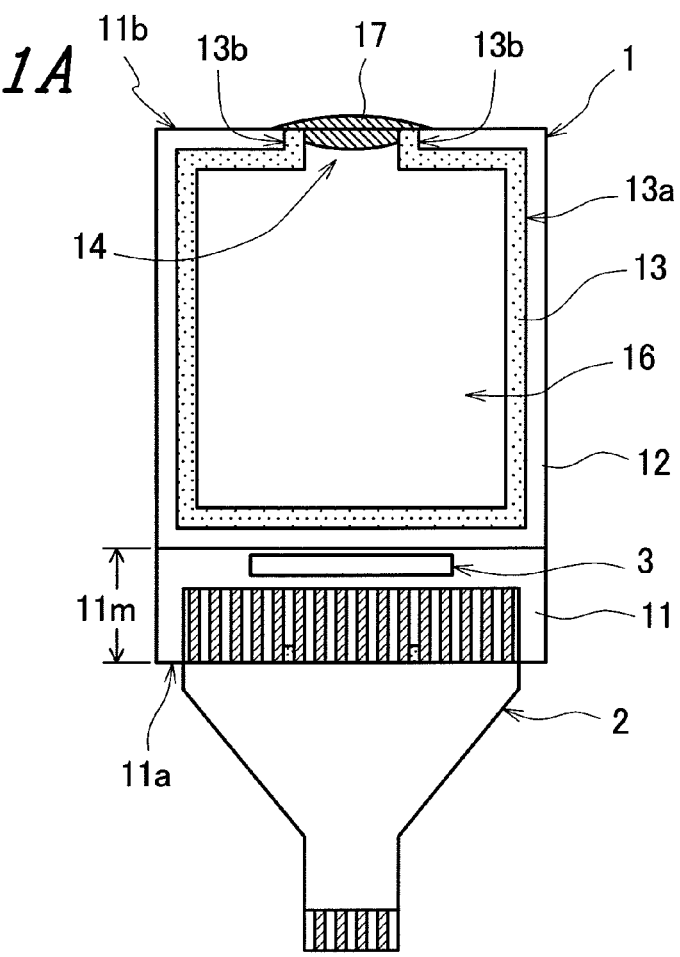

Hereinafter, embodiments of the invention will be described in detail with reference to the accompanying drawings. It should be noted that throughout the drawings for explaining the embodiments of the invention, those having the same function are denoted with the same reference numerals, and redundant explanations therefor will be omitted.

The liquid crystal display module of the embodiment of the present invention is a TFT liquid crystal display module having a small-sized liquid crystal display panel as small as 240×320×3 in color display, and is used as a display section of portable equipment such as a cellular phone.

First Embodiment

Figure 1B:
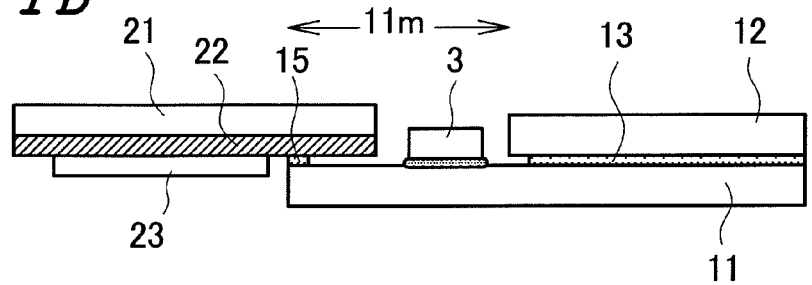
Figure 1C:
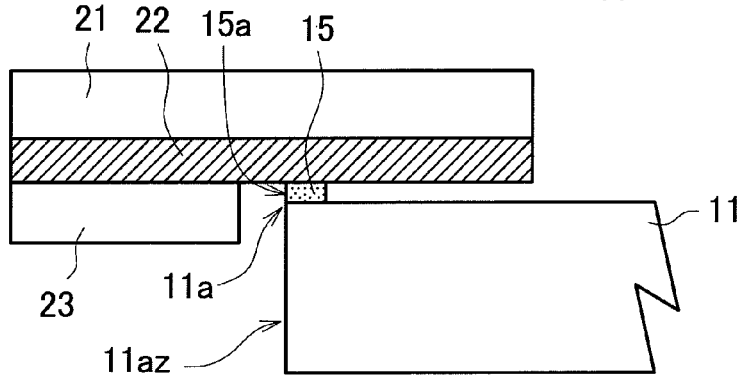
Figure 2:
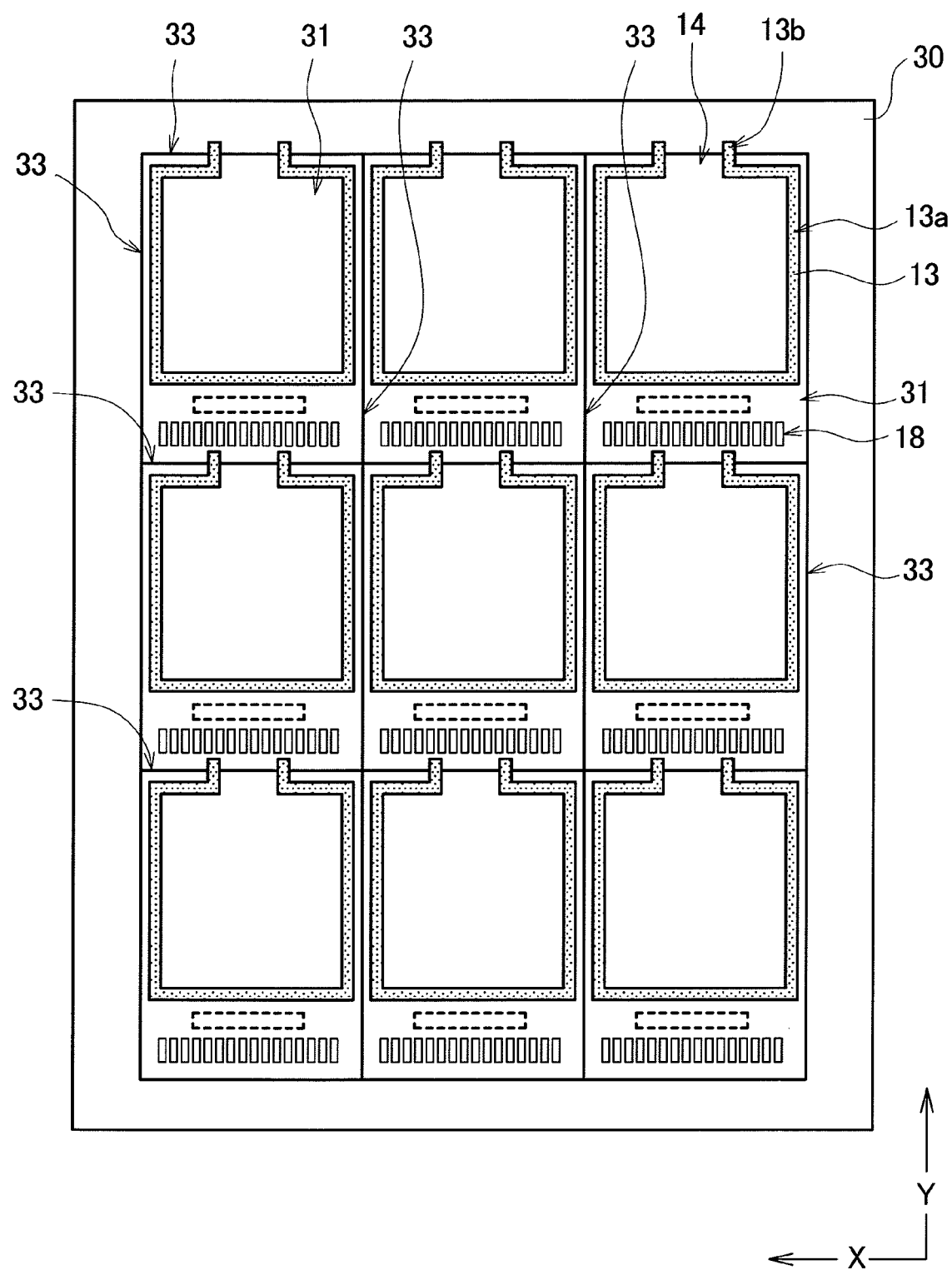
FIG. 2 is a plan view showing a schematic configuration of a multi-TFT substrate used for manufacturing the liquid crystal display module as the first embodiment of the present invention.
Figure 3:
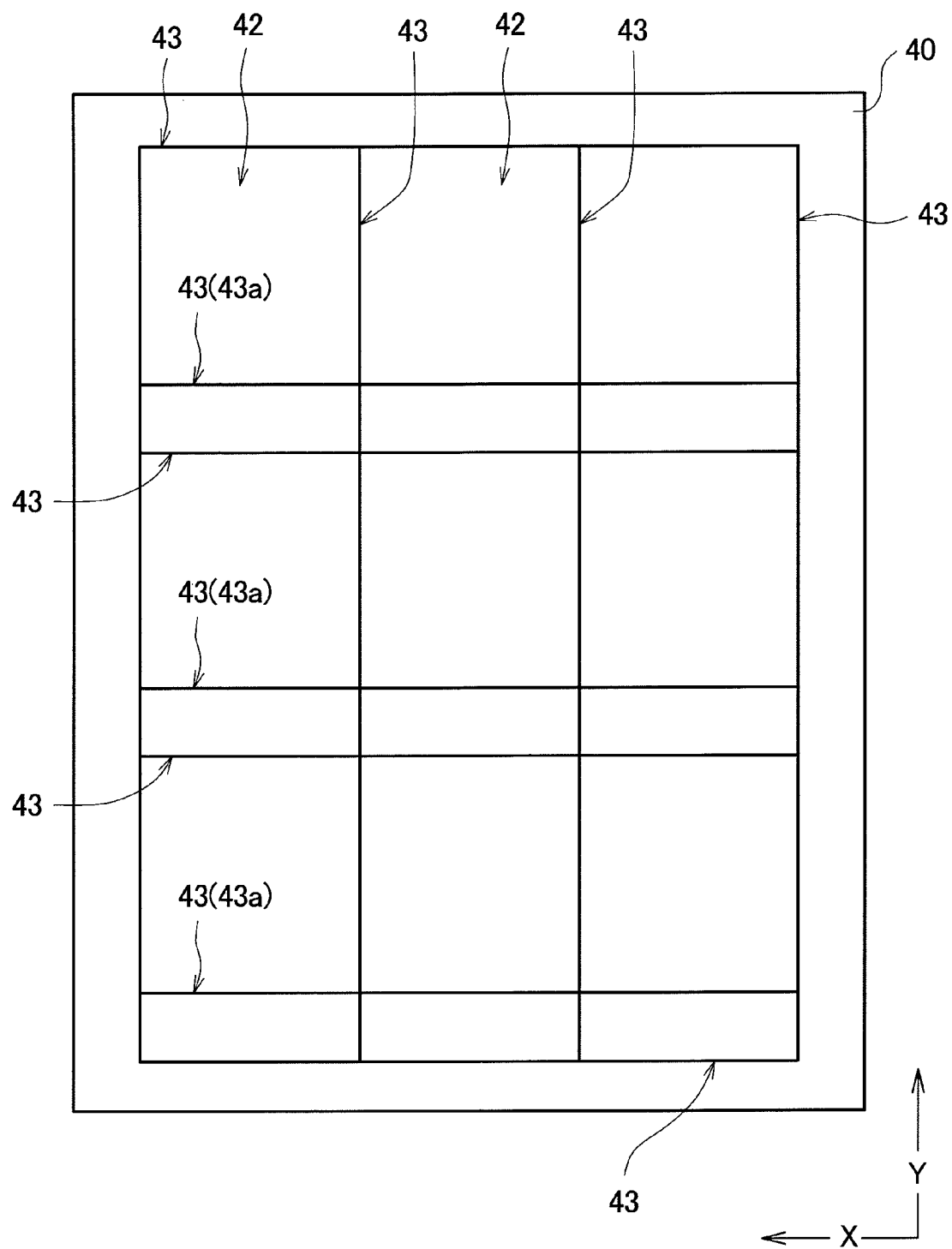
FIG. 3 is a plan view showing a schematic configuration of a multi-CF substrate used for manufacturing the liquid crystal display module as the first embodiment of the present invention.
Figure 4:
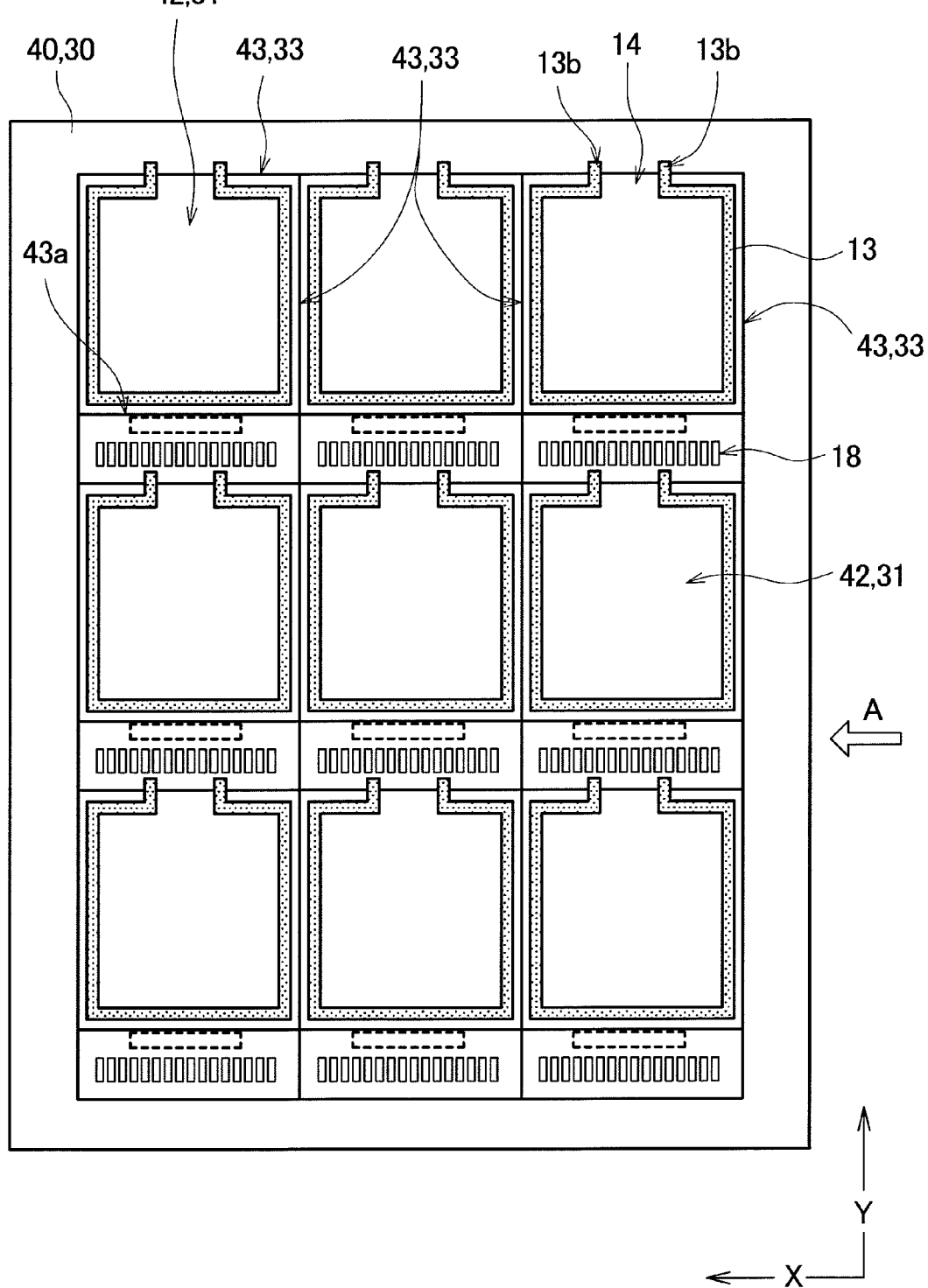
FIG. 4 is a plan view showing the state of bonding the multi-TFT substrate shown in FIG. 2 and the multi-CF substrate shown in FIG. 3 with each other in the manufacturing process of the liquid crystal display module as the first embodiment of the present invention.
Figure 5:
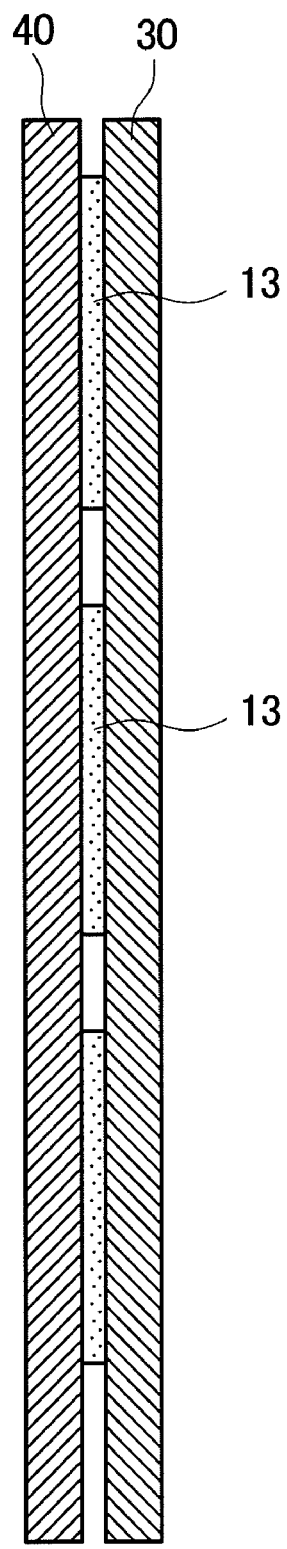
FIG. 5 is a side view viewed in the direction of the arrow A shown in FIG. 4.
Figure 6A:
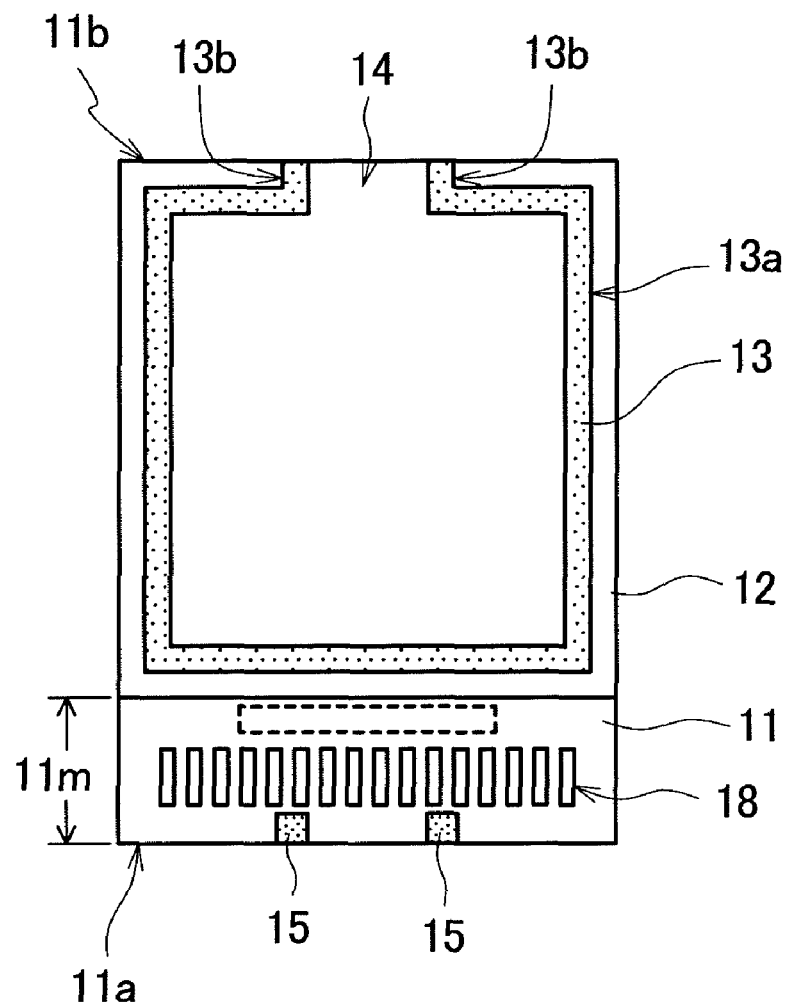
Figure 6B:
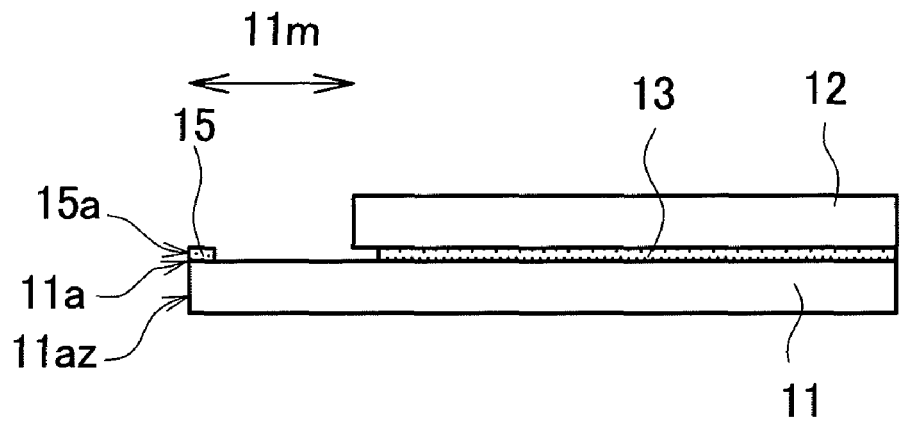

FIGS. 1 through 5, 6A, and 6B are diagrams related to the liquid crystal display module of the first embodiment of the present invention, wherein FIGS. 1A, 1B, and 1C are diagrams showing a schematic configuration of the liquid crystal display module, FIG. 2 is a plan view showing a schematic configuration of a multi-TFT substrate used for manufacturing the liquid crystal display module, FIG. 3 is a plan view showing a schematic configuration of a multi-CF substrate used for manufacturing the liquid crystal display module, FIG. 4 is a plan view showing the state of bonding the multi-TFT substrate and the multi-CF substrate with each other in the manufacturing process of the liquid crystal display module, FIG. 5 is a side view viewed in the direction of the arrow A shown in FIG. 4, and FIGS. 6A and 6B are diagrams showing a schematic configuration of the liquid crystal display panel formed by dividing (segmenting) the multi-TFT substrate and the multi-CF substrate thus bonded with each other along the scribe lines in the manufacturing process of the liquid crystal display module.

It should be noted that in FIGS. 1A through 1C, FIG. 1A is a plan view, FIG. 1B is a side view, and FIG. 1C is an enlarged diagram of a part of FIG. 1B. Further, in FIGS. 6A and 6B, FIG. 6A is a plan view, FIG. 6B is a side view.

As shown in FIGS. 1A through 1C, the liquid crystal display module of the first embodiment is provided with a liquid crystal display panel 1, a flexible printed circuit board (FPC) 2 connected to the liquid crystal display panel 1, and a semiconductor chip 3 including a circuit for performing drive control of the liquid crystal display panel 1. Further, the liquid crystal module of the first embodiment is provided with a backlight unit disposed under the liquid crystal display panel 1, and a resin-molded frame for housing the liquid crystal display panel 1 although not shown in the drawings.

The liquid crystal display panel 1 has a configuration including a first substrate (hereinafter referred to as a TFT substrate) 11 provided with pixel electrodes, thin film transistors, and soon, a second substrate (hereinafter referred to as a CF substrate) 12 provided with a color filter and so on, a seal member 13 disposed between the TFT substrate 11 and the CF substrate 12 and for bonding the TFT substrate 11 and the CF substrate 12 with each other, a liquid crystal inlet port 14 provided to apart of the seal member 13, a liquid crystal material input into and encapsulated in the space 16 between the TFT substrate 11 and the CF substrate 12 and surrounded by the seal member 13, and a liquid crystal sealing member 17 for sealing the liquid crystal inlet port 14.

As the TFT substrate 11 and the CF substrate 12, there are used glass substrates, for example. As the seal member 13, there is used a thermoset epoxy resin material, for example.

It should be noted that any insulating materials can be used as the materials of the TFT substrate 11 and the CF substrate 12, and plastic and so on can also be used therefor besides the glass.

Each of the TFT substrate 11 and the CF substrate 12 has a rectangular planer shape, and is, for example, formed of an oblong having long sides and short sides. The TFT substrate 11 is configured to have long sides longer than the long sides of the CF substrate 12 to have an area (hereinafter referred to as a non-overlapping area) 11m not overlapping the CF substrate 12 on the side of one (11a) of the two short sides (11a, 11b) located opposite to each other. The non-overlapping area 11m of the TFT substrate 11 is provided with the semiconductor chip 3 mounted thereon, and further, a plurality external connection terminals 18 (see FIG. 6A) along the one short side 11a (the short side on the side of the non-overlapping area 11m) of the TFT substrate 11.

The liquid crystal inlet port 14 is provided on the side of the other short side 11b (the short side opposite to the non-overlapping area 11m) of the TFT substrate 11. The seal member 13 has both functions of bonding the TFT substrate 11 and the CF substrate 12 with each other and of inputting and encapsulating the liquid crystal material, and is configured to have a frame part (a first part) 13a disposed between the TFT substrate 11 and the CF substrate 12 on the periphery thereof like a frame and a pair of inlet port parts (second parts) 13b extending from the frame part 13a at both sides of the liquid crystal inlet port 14 towards the opposite short side 11b (opposite to the frame part 13a) of the TFT substrate 11.

It should be noted that the present invention is not related to the inside structure of the liquid crystal panel 1, the detailed description of the inside structure of the liquid crystal display panel 1 will be omitted. Further, the present invention can be applied to liquid crystal display panels with any structures.

The flexible printed circuit board 2 is configured to have a flexible film 21, a plurality of wiring lines 22 formed on one principal surface of the flexible film 21, and a protective film 23 formed on the one principal surface of the flexible film 21 so as to cover the plurality of wiring lines 22. The plurality of wiring lines 22 each extends so as to traverse the one short side 11a of the TFT substrate 11. One ends of the plurality of wiring lines 22 are arranged in parallel to each other correspondingly respectively to a plurality of external connection terminals 18 (see FIG. 6A) disposed in the non-overlapping area 11m of the TFT substrate 11, and are electrically and mechanically connected respectively to the plurality of external connection terminals 18 with, for example, anisotropic conductive films (ACF).

The non-overlapping area 11m of the TFT substrate 11 is provided with a pair of protruding members 15 made of the same material as that of the seal member 13. At least a part of the pair of protruding members 15 is located on the extension of the pair of inlet port parts (the second parts) 13b of the seal member 13, specifically, at least a part of one of the protruding members 15 is located on the extension of one of the inlet port parts 13b while at least a part of the other of the protruding members 15 is located on the extension of the other of the inlet port parts 13b. Further, each of the pair of protruding members 15 is cut at the position where the protruding member 15 has a surface 15a coplanar with the side surface 11az along the one short side 11a of the TFT substrate 11 to be in alignment with the one short side 11a of the TFT substrate 11.

In the manufacturing process of the liquid crystal display module of the first embodiment, in order for achieving improvement in throughput, there are used a first multi-substrate (hereinafter referred to as a multi-TFT substrate) having a plurality of product forming regions (device forming regions, product obtaining regions) each separated with scribe lines, and provided with pixel electrodes, thin film transistors, and so on, and a second multi-substrate (hereinafter referred to as a multi-CF substrate) having a plurality of product forming regions (device forming regions, product obtaining regions) each separated with scribe lines, and provided with a color filter, and so on, and after providing a seal member to each of the product forming regions of the multi-TFT substrate, the multi-TFT substrate and the multi-CF substrate are bonded with the seal members, and then the multi-TFT substrate and the multi-CF substrate are divided (segmented) along the respective scribe lines, thereby forming the liquid crystal display panels 1.

Then, the multi-TFT substrate and the multi-CF substrate used for manufacturing the liquid crystal display module of the first embodiment will be explained with reference to FIGS. 2 and 3.

As shown in FIG. 2, the multi-TFT substrate 30 has a rectangular planar shape, for example, an oblong shape in the first embodiment. The multi-TFT substrate 30 is provided with a plurality of product forming regions (device forming regions, product obtaining regions) 31 disposed in a matrix in X and Y directions perpendicular to each other in the same plane, and each of the product forming regions 31 is provided with the pixel electrodes, the thin film transistors, and so on.

Each of the product forming regions 31 is separated with scribe lines (separating areas) 33, and has basically the same structure and planar shape as those of the TFT substrate 11 shown in FIGS. 1A through 1C. The TFT substrate 11 is formed by discretely segmenting the each of the product forming regions 31 of the multi-TFT substrate 30. In the first embodiment, the multi-TFT substrate 30 is configured to have, for example, nine product forming regions 31 disposed in a 3×3 matrix although not limited thereto.

It should be noted that FIG. 2 shows the state in which each of the product forming regions is provided with the seal member 13.

As shown in FIG. 3, the multi-CF substrate 40 has a rectangular planar shape, for example, an oblong shape in the first embodiment. The multi-CF substrate 40 is provided with a plurality of product forming regions (device forming regions, product obtaining regions) 42 disposed in a matrix in X and Y directions perpendicular to each other in the same plane, and each of the product forming regions 42 is provided with the color filters, and so on.

Each of the product forming regions 42 is separated with scribe lines (separating areas) 43, and has basically the same structure and planar shape as those of the CF substrate 12 shown in FIGS. 1A through 1C. The CF substrate 12 is formed by discretely segmenting the each of the product forming regions 42 of the multi-CF substrate 40. In the first embodiment, the multi-CF substrate 40 is configured to have, for example, nine product forming regions 42 disposed in a 3×3 matrix corresponding to the product forming regions 31 of the multi-TFT substrate 30 although not limited thereto.

It should be noted that in FIG. 3, the scribe lines 43a out of the scribe lines 43 are for provide the TFT substrates 11 with the areas not overlapping the CF substrates 12.

Now, the manufacturing of the liquid crystal display module of the first embodiment will be explained with reference to FIGS. 2 through 5, 6A, and 6B.

Firstly, the multi-TFT substrate 30 shown in FIG. 2 and the multi-CF substrate 40 shown in FIG. 3 are prepared.

Subsequently, as shown in FIG. 2, the seal member 13 made, for example, of a thermoset epoxy resin material is provided to each of the product forming regions 31 of the multi-TFT substrate 30. The seal member 13 is formed by, for example, a dispensing method with a single stroke without a break. In this process, the liquid crystal inlet port 14 is provided to a part of the seal member 13. Further, the seal member 13 is formed to have the shape including the frame part (the first part) 13a disposed like a frame on the periphery of the product forming region 31, and the pair of inlet port parts (the second parts) 13b respectively extending from the frame part 13a on the both sides of the liquid crystal inlet port 14 towards the opposite side to the frame part 13a. Further, the inlet port parts 13b of the seal member 13 are formed to traverse the scribe line 33 between two product forming regions 31 adjacent to each other in the Y direction. In other words, in the two product forming regions 31 adjacent to each other in the Y direction, the inlet port parts 13b of the seal member 13 of one of the product forming regions 31 are partially formed in the other of the product forming regions 31.

Subsequently, after the seal members 13 are thus formed, the multi-TFT substrate 30 and the multi-CF substrate 40 are overlapped and positioned so that the seal members 13 are interposed between each of the product forming regions 31 of the multi-TFT substrate 30 and the respective one of the product forming regions 42 of the multi-CF substrate 40, and then the seal members 13 are cured by heating the multi-TFT substrate and the multi-CF substrate 40 in a pressurized condition, thus the product forming regions 31 of the multi-TFT substrate 30 and the product forming regions 42 of the multi-CF substrate 40 are respectively bonded to be sealed (see FIGS. 4 and 5). In this process, the multi-TFT substrate 30 and the multi-CF substrate 40 are bonded with the seal members 13.

Subsequently, the multi-TFT substrate 30 and the multi-CF substrate 40 in the bonded condition are cut along the respective scribe lines 33, 34 to be discretely divided (segmented) into the individual product forming regions 31, 42. Thus, the TFT substrates 11 formed of the product forming regions 31 of the multi-TFT substrate 30 are formed, and at the same time, the CF substrates 12 formed of the product forming regions 42 of the multi-CF substrate 40 are formed. Further, the liquid crystal display panels 1 each provided with these substrates are also formed (see FIGS. 6A and 6B).

In this process, since the inlet port parts 13b of the seal members 13 are also cut, in the two product forming regions 31 adjacent to each other in the Y direction, a part of the inlet port part 13b of the seal member 13 of one of the product forming regions 31 remains to the other of the product forming regions 31 as the protruding member 15 as shown in FIG. 6.

In other words, in the two liquid crystal display panels 1 formed to be adjacent to each other in the Y direction, a part of the inlet port part 13b of the seal member 13 of one of the liquid crystal display panels 1 remains in the one short side 11a of the TFT substrate 11 of the other of the liquid crystal display panels 1 as the protruding member 15. Subsequently, the liquid crystal material is injected from the liquid crystal inlet port 14 of the seal member 13, and then the liquid crystal inlet port 14 is sealed with the liquid crystal sealing member 17 made, for example, of epoxy resin.

Subsequently, a polarization plates are attached respectively to the TFT substrate 11 and the CF substrate 12 of the liquid crystal display panel 1, then the semiconductor chip 3 is mounted on the non-overlapping area 11m of the TFT substrate 11, then the plurality of external connection terminals 18 disposed in the non-overlapping area 11m of the TFT substrate 11 and the one ends of the plurality of wiring lines 22 of the flexible printed circuit board 2 are electrically and mechanically connected to each other, respectively, with, for example, the anisotropic conducting film called ACF, then the liquid crystal display panel 1 is disposed on the backlight unit previously manufactured separately, and then the liquid crystal display panel 1 is housed in the resin-molded frame together with the backlight unit, thus the liquid crystal display module of the first embodiment is almost completed.

As shown in FIG. 2, according to the first embodiment, in the two product forming regions 31 adjacent to each other along the Y direction of the multi-TFT substrate 30, the seal member 13 of one of the product forming regions 31 is formed so that the inlet port parts 13b traverse the scribe line 33 between the one of the product forming regions 31 and the other of the product forming regions 31, and the part of the inlet port parts 13b is disposed in the other of the product forming regions 31. By adopting such a configuration, since the distance from the frame part 13a of the seal member 13 of the one of the product forming regions 31 to the scribe line 33 between the one of the product forming regions 31 and the other of the product forming regions 31 can be reduced, the number of the product forming regions 31 along the Y direction, namely the number of the columns of the product forming regions 31 along the X direction, can be increased without reducing the display area of the liquid crystal display panel 1 depending on the outside dimensions of the liquid crystal display panel 1. Thus, since the product obtaining rate at which the product can be obtained from a single multi-substrate can be increased, the cost reduction of the liquid crystal display module can be achieved.

Further, from another viewpoint of the present invention, in the liquid crystal display panel having the first substrate 11 with a rectangular shape, the second substrate 12 with a rectangular shape smaller in size than the first substrate 11, and the seal member 13 disposed so as to surround a liquid crystal material disposed in the area where the first substrate 11 and the second substrate 12 overlap each other, the first substrate 11 has the first side 11a and the second side 11b located opposite to each other, and the non-overlapping area 11m not overlapping the second substrate 12 on the side of the first side 11a, the seal member 13 is provided with the liquid crystal inlet port 14 on the side of the second side 11b of the first substrate 11, the liquid crystal inlet port 14 is provided with a sealing member (not shown), and the protruding members 15 made of the same material as that of the seal member 13 are disposed on the end of the first side 11a of the first substrate 11 at the positions corresponding to the ends (the inlet port parts 13b) of the opening of the liquid crystal inlet port 14 disposed on the side of the second side 11b.

Further, in the liquid crystal display panel, since the protruding member 15 is a part remaining when cutting the first substrate 11, the protruding member 15 has a surface in alignment with the side surface along the first side 11a of the first substrate 11. In other words, it is arranged that the cut surface of the first substrate 11 and the side surface of the protruding member 15 are formed on the same plane.

Further, in this liquid crystal display panel, the protruding member 15 is cut at the position where the protruding member 15 is in alignment with the side surface along the first side 11a of the first substrate 11.

It should be noted that in the case in which the only one liquid crystal inlet port 14 is provided to the liquid crystal display panel as shown in FIGS. 6A and 6B, two protruding members 15 are disposed in accordance with the positions corresponding to the ends 13b of the opening section of the liquid crystal inlet port. Therefore, although not shown in the drawings, in the case of providing two liquid crystal inlet ports, four protruding members are disposed. Although the explanations are omitted, in the case in which three or more liquid crystal inlet ports are provided, 2n protrusion members are formed in accordance with the number n of the liquid crystal inlet ports.

Further, the liquid crystal display panel has a plurality of terminals 18 disposed in the non-overlapping area 11m of the first substrate 11, the flexible printed circuit board 2 provided with a plurality of wiring lines is connected to the plurality of terminals 18, and the plurality of wiring lines are divided into three wiring line groups in the part overlapping the non-overlapping area 11m of the first substrate 11 in a plan view avoiding the protruding members 15.

It should be noted that since the liquid crystal inlet port is not formed so largely, the number of the lines in the middle one of the three wiring line groups becomes smaller than that in the other two wiring line groups.

From another point of view, the liquid crystal display panel has a plurality of terminals 18 disposed in the non-overlapping area 11m of the first substrate 11, the flexible printed circuit board 2 provided with a plurality of wiring lines is connected to the plurality of terminals 18, and the plurality of wiring lines are patterned in the part overlapping the non-overlapping area 11m of the first substrate 11 in a plan view so as to avoid the protruding members 15.

In the case with this liquid crystal display panel, the plurality of wiring lines has narrower pitches in the part patterned to avoid the protruding members 15 than the arrangement pitches of the tip portions of the one ends thereof.

Incidentally, in the first embodiment, in the two product forming regions 31 adjacent to each other along the Y direction of the multi-TFT substrate 30, a part of the inlet port parts 13b of the seal member 13 of the one of the product forming regions 31 remains in the other of the product forming regions 31, thus the protruding member 15 is disposed on the side of the one short side 11a of the TFT substrate 11 as shown in FIG. 6. Since the flexible printed circuit board 2 is connected to the non-overlapping area 11m of the TFT substrate 11 in one end thereof traversing the one short side 11a of the TFT substrate 11, the pair of protruding members 15 formed of the part of each of the pair of inlet port parts 13b of the seal member 13 provided on the side of the one short side 11a of the TFT substrate 11 becomes a factor causing a connection fault when connecting the one end of the flexible printed circuit board 2 to the non-overlapping area 11m of the TFT substrate 11 by pressure bonding.

Therefore, in the second and third embodiments described below, the examples for preventing the connection fault caused by the pair of protruding members 15 will be explained.

Second Embodiment

Figure 8:
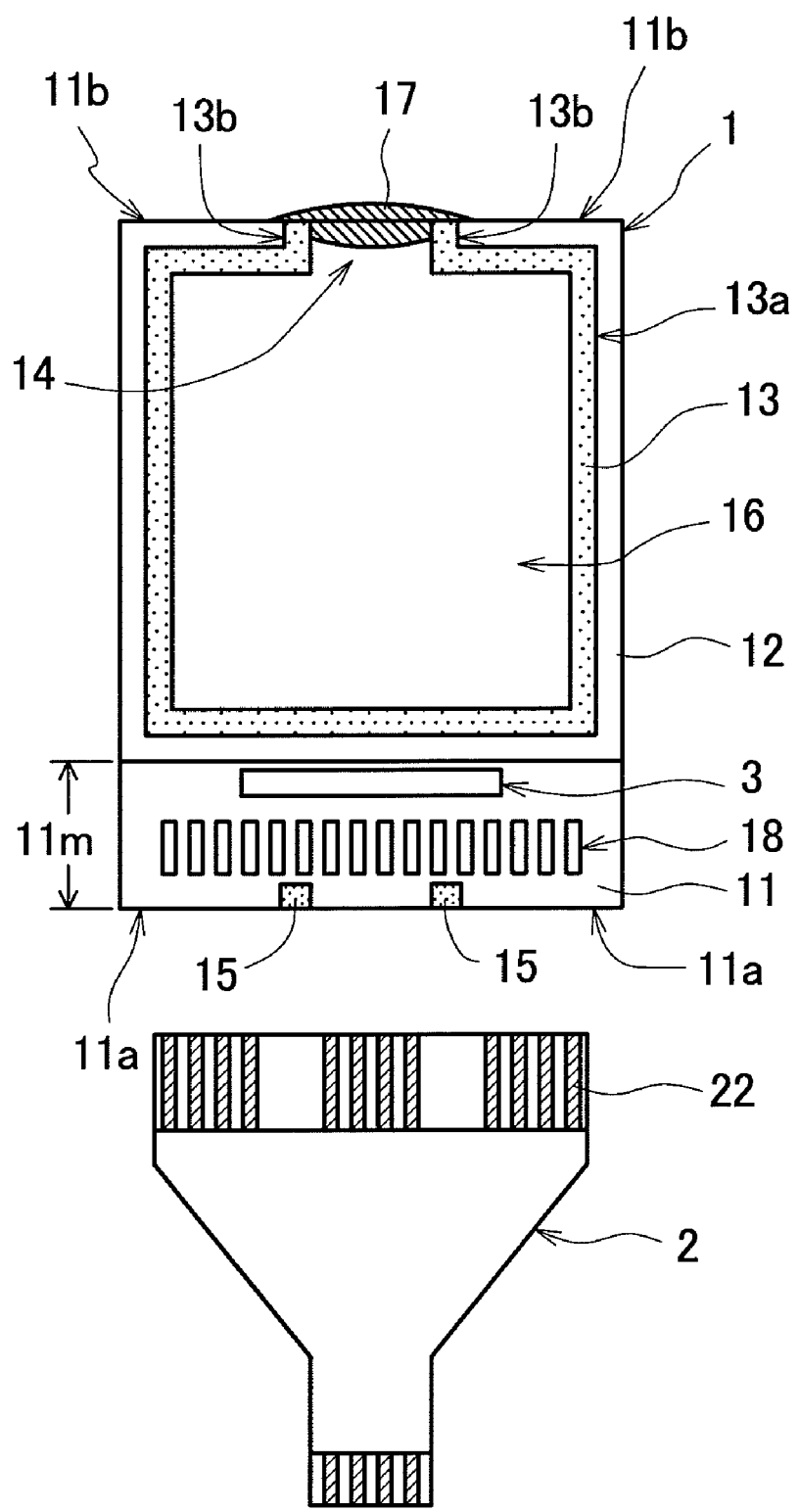
FIG. 8 is a diagram showing the state of detaching the flexible printed circuit board from the liquid crystal display panel.

FIGS. 7A through 7C, and 8 are diagrams related to the liquid crystal display module as the second embodiment of the present invention, wherein FIGS. 7A through 7C are diagrams showing a schematic configuration of the liquid crystal display module, and FIG. 8 is a diagram showing a state of detaching the flexible printed circuit board from the liquid crystal display panel.

It should be noted that in FIGS. 7A through 7C, FIG. 7A is a plan view, FIG. 7B is a side view, and FIG. 7C is an enlarged diagram of a part of FIG. 7B.

As shown in FIGS. 7A through 7C, the flexible printed circuit board 2 is provided with a plurality of wiring lines 22 each extending so as to traverse the one short side 11a of the TFT substrate 11, and having one ends electrically and mechanically connected respectively to the plurality of external connection terminals 18 disposed in the non-overlapping area 11m of the TFT substrate 11. As shown in FIGS. 7A through 7C and 8, the plurality of wiring lines 22 are divided into three wiring line groups in the part overlapping the non-overlapping area 11m of the TFT substrate 11 in a plan view avoiding the pair of protruding members 15. The middle one of the three wiring line groups has a smaller number of wiring lines 22 than the other two wiring line groups. By adopting such a configuration, the connection fault caused when connecting the one end of the flexible printed circuit board 2 to the non-overlapping area 11m of the TFT substrate 11 by pressure bonding can be prevented even if the pair of protruding members 15 are disposed on the side of the one short side 11a of the TFT substrate 11.

As a result, improvement in the reliability of the liquid crystal display module can be achieved in addition to the cost reduction in the first embodiment.

Third Embodiment

Figure 9:
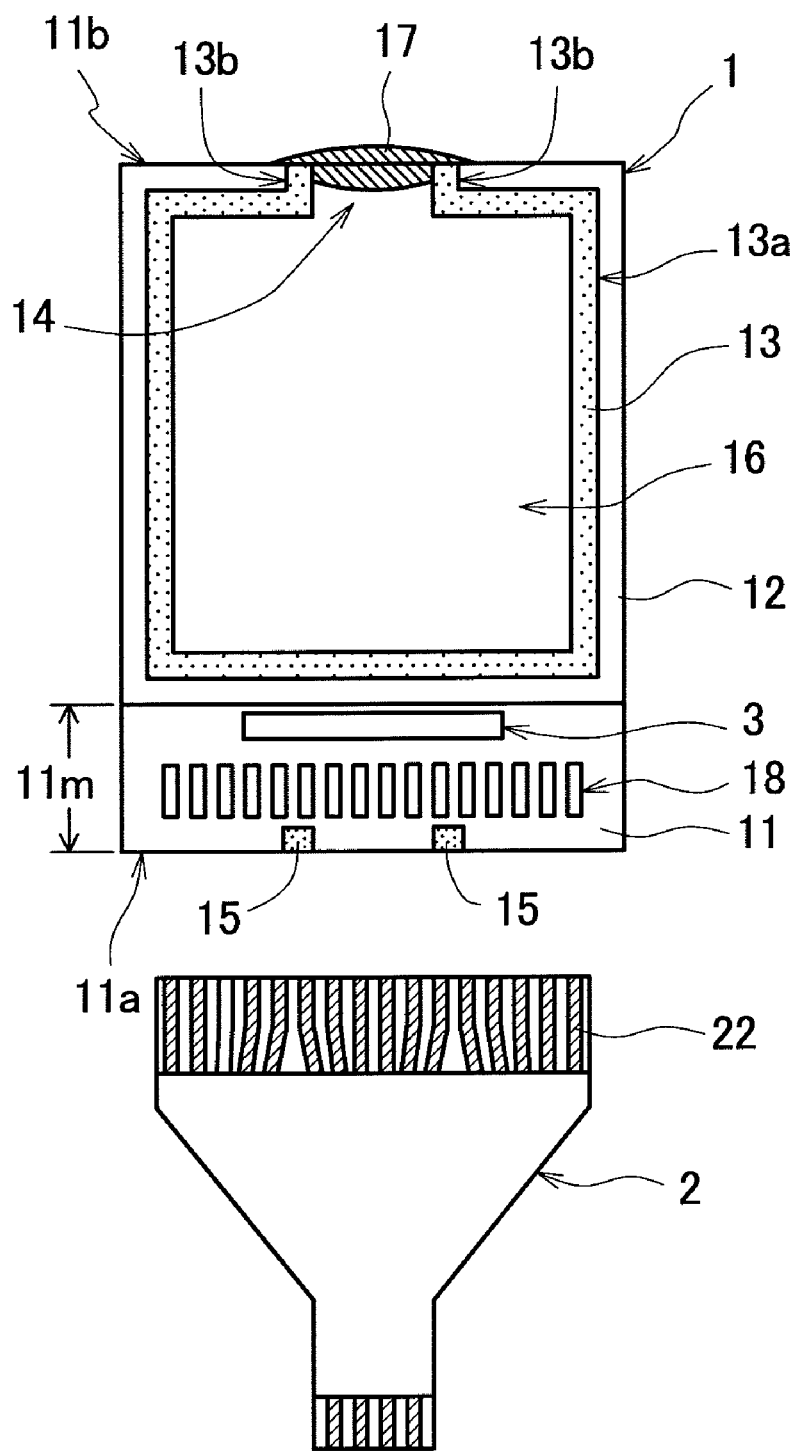
FIG. 9 is a diagram showing a schematic configuration of the liquid crystal display module as a third embodiment of the present invention.

FIG. 9 is a diagram showing a schematic configuration of the liquid crystal display module as a third embodiment of the present invention. It should be noted that FIG. 9 shows the state of detaching the flexible printed circuit board from the liquid crystal display panel similarly to FIG. 8.

The flexible printed circuit board 2 is provided with a plurality of wiring lines 22 each extending so as to traverse the one short side 11a of the TFT substrate 11, and having one ends electrically and mechanically connected respectively to the plurality of external connection terminals 18 disposed in the non-overlapping area 11m of the TFT substrate 11. The plurality of wiring lines 22 is patterned in the part overlapping the non-overlapping area 11m of the TFT substrate 11 in a plan view so as to avoid the pair of protruding members 15. Further, the plurality of wiring lines 22 have narrower pitches in the part patterned to avoid the pair of protruding members 15 than the arrangement pitches of the tip portions of the one ends thereof. By adopting such a configuration, the connection fault caused when connecting the one end of the flexible printed circuit board 2 to the non-overlapping area 11m of the TFT substrate 11 by pressure bonding can be prevented even if the pair of protruding members 15 are disposed on the side of the one short side 11a of the TFT substrate 11. As a result, improvement in the reliability of the liquid crystal display module can be achieved in addition to the cost reduction in the first embodiment.

It should be noted that although in the embodiments described above, there is explained the example in which the inlet port parts (the second parts) 13b of the seal member 13 extends from the frame part (the first part) 13a thereof towards the other short side 11b of the TFT substrate 11 along the direction perpendicular to the short sides 11a, 11b of the TFT substrate 11 in the same plane, the present invention can also be applied to the case in which the inlet port parts 13b of the seal member 13 extends from the frame part 13a thereof towards the other short side 11b of the TFT substrate 11 along the direction obliquely intersecting to the other short side 11b of the TFT substrate 11 in the same plane. In this case, at least a part of the pair of protruding members 15 is located on a virtual line extending virtually from the pair of inlet port parts 13b of the seal member 13 towards the one short side 11a of the TFT substrate 11 along the direction perpendicular to the other short side 11b of the TFT substrate 11 in the same plane, specifically at least a part of the one of the protruding members 15 is located on one virtual line extending virtually from one of the pair of inlet port parts 13b of the seal member 13 towards the one short side 11a of the TFT substrate 11 along the direction perpendicular to the other short side 11b of the TFT substrate 11 in the same plane, and at least a part of the other of the protruding members 15 is located on the other virtual line extending virtually from the other of the pair of inlet port parts 13b of the seal member 13 towards the one short side 11a of the TFT substrate 11 along the direction perpendicular to the other short side 11b of the TFT substrate 11 in the same plane. In other words, the protruding members 15 disposed on the side of the one short side 11a of the TFT substrate 11 are disposed in accordance with the positions corresponding to the inlet port parts 13b of the seal member 13 disposed on the side of the other short side 11b of the TFT substrate 11. The relative positional relationship between the protruding members 15 and the inlet port parts 13b of the seal member 13 is the same in the embodiments described above.

Although the invention made by the inventors is specifically explained above along the embodiments, it is obvious that the present invention is not limited to these embodiments, but can be modified in various manners within the range not extending beyond the scope of the present invention.

What is claimed is:

1. A liquid crystal display device comprising:
    a liquid crystal display panel including
    a first substrate,
    a second substrate;
    a seal member disposed between the first substrate and the second substrate, and for bonding the first substrate and the second substrate with each other;
    a liquid crystal inlet port provided to a part of the seal member;
    a liquid crystal material disposed in a space between the first substrate and the second substrate and surrounded by the seal member;
    wherein the first substrate has first and second sides located opposite to each other;
    wherein the first substrate has a non-overlapping area not overlapping the second substrate on the side of the first side of the first substrate;
    wherein the liquid crystal inlet port is disposed on the side of the second side of the first substrate;
    wherein the seal member has a first part disposed like a frame on a periphery of an area between the first substrate and the second substrate, and a pair of second parts respectively extending from the first part on both sides of the liquid crystal inlet port towards the second side of the first substrate;

wherein the non-overlapping area of the first substrate is provided with a pair of protruding members made of the same material as the seal member; and a flexible printed circuit board having a plurality of wiring lines connected to the non-overlapping area of the first substrate, wherein the plurality of wiring lines are divided into three wiring line groups in a part overlapping the non-overlapping area of the first substrate in a plan view avoiding the pair of protruding members.

2. The liquid crystal display device according to claim 1, wherein at least a part of the pair of protruding members is located on extension lines of the pair of second parts of the seal member.

3. The liquid crystal display device according to claim 1, wherein the pair of protruding members each have a surface in alignment with a side surface along the first side of the first substrate.

4. The liquid crystal display device according to claim 1, wherein the pair of protruding members are cut at a position where the pair of protruding members are in alignment with a side surface along the first side of the first substrate.

5. The liquid crystal display device according to claim 3, wherein the first side of the first substrate is unchamfered.

6. The liquid crystal display device according to claim 1, wherein a middle one of the three wiring line groups has a smaller number of wiring lines than the other two wiring line groups.

7. The liquid crystal display device according to claim 1, wherein the first substrate has a plurality of terminals disposed in the non-overlapping area of the first substrate, the pair of protruding members are disposed between the plurality of terminals and the first side of the first substrate, and one ends of the plurality of wiring lines are connected respectively to the plurality of terminals.

8. A liquid crystal display device comprising:

a liquid crystal display panel including a first substrate;

a second substrate;

a seal member disposed between the first substrate and the second substrate, and for bonding the first substrate and the second substrate with each other a liquid crystal inlet port provided to a part of the seal member;

a liquid crystal material disposed in a space between the first substrate and the second substrate and surrounded by the seal member;

wherein the first substrate has first and second sides located opposite to each other;

wherein the first substrate has a non-overlapping area not overlapping the second substrate on the side of the first side of the first substrate;

wherein the liquid crystal inlet port is disposed on the side of the second side of the first substrate;

wherein the seal member has a first part disposed like a frame on a periphery of an area between the first substrate and the second substrate, and a pair of second parts respectively extending from the first part on both sides of the liquid crystal inlet port towards the second side of the first substrate;

wherein the non-overlapping area of the first substrate is provided with a pair of protruding members made of the same material as the seal member; and a flexible printed circuit board having a plurality of wiring lines connected to the non-overlapping area of the first substrate;

wherein the plurality of wiring lines are patterned so as to avoid the pair of protruding members in a part overlapping the non-overlapping area of the first substrate in a plan view.

9. The liquid crystal display device according to claim 8, wherein the plurality of wiring lines has narrower pitches in the part patterned to avoid the pair of protruding members than arrangement pitches of tip portions of the one ends of the plurality of wiring lines.

10. A liquid crystal display panel comprising:

a first substrate with a rectangular shape;

a second substrate with a rectangular shape smaller in size than the first substrate;

a seal member disposed so as to surround a liquid crystal material disposed in an area where the first substrate and the second substrate overlap each other;

wherein the first substrate has first and second sides located opposite to each other, and has a non-overlapping area not overlapping the second substrate on the side of the first side;

wherein the seal member is provided with a liquid crystal inlet port on the side of the second side of the first substrate, and the liquid crystal inlet port is provided with a sealing member; and a protruding member made of the same material as the seal member is disposed on an end of the first side of the first substrate in accordance with a position corresponding to an end of an opening of the liquid crystal inlet port disposed on the side of the second side;

wherein the non-overlapping area of the first substrate is provided with a plurality of terminals to which a flexible printed circuit board provided with a plurality of wiring lines is connected; and wherein the plurality of wiring lines are divided into three wiring line groups in a part overlapping the non-overlapping area of the first substrate in a plan view avoiding the protruding member.

11. The liquid crystal display panel according to claim 10, wherein the protruding member has a surface in alignment with a side surface along the first side of the first substrate.

12. The liquid crystal display panel according to claim 10, wherein the protruding member is cut at a position where the protruding member is in alignment with a side surface along the first side of the first substrate.

13. The liquid crystal display panel according to claim 10, wherein the liquid crystal inlet port is disposed at one place on the side of the second side of the first substrate, and the protruding member is disposed at each of two positions corresponding to the ends of the opening section of the liquid crystal inlet port.

14. The liquid crystal display panel according to claim 10, wherein the number of wiring lines in a middle one of the three wiring line groups is smaller than the number of wiring lines in the other two wiring line groups.

15. A liquid crystal display panel comprising:

a first substrate with a rectangular shape;

a second substrate with a rectangular shape smaller in size than the first substrate;

a seal member disposed so as to surround a liquid crystal material disposed in an area where the first substrate and the second substrate overlap each other;

wherein the first substrate has first and second sides located opposite to each other, and has a non-overlapping area not overlapping the second substrate on the side of the first side;

wherein the seal member is provided with a liquid crystal inlet port on the side of the second side of the first substrate, and the liquid crystal inlet port is provided with a sealing member; and a protruding member made of the same material as the seal member is disposed on an end of the first side of the first substrate in accordance with a position corresponding to an end of an opening of the liquid crystal inlet port disposed on the side of the second side wherein the non-overlapping area of the first substrate is provided with a plurality of terminals to which a flexible printed circuit board provided with a plurality of wiring lines is connected; and wherein the plurality of wiring lines are patterned so as to avoid the protruding member in a part overlapping the non-overlapping area of the first substrate in a plan view.

16. The liquid crystal display panel according to claim 15, wherein the plurality of wiring lines has narrower pitches in the part patterned to avoid the protruding member than arrangement pitches of tip portions of the one ends of the plurality of wiring lines.

* * * * *